United States Patent
Puskarich

(10) Patent No.: US 12,159,080 B2
(45) Date of Patent: *Dec. 3, 2024

(54) ELECTRONIC DEVICES FOR FOCUSED LISTENING

(71) Applicant: Apple Inc., Cupertino, CA (US)

(72) Inventor: Paul G. Puskarich, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/464,780

(22) Filed: Sep. 11, 2023

(65) Prior Publication Data

US 2023/0418546 A1 Dec. 28, 2023

Related U.S. Application Data

(63) Continuation of application No. 17/374,348, filed on Jul. 13, 2021, now Pat. No. 11,803,348.

(60) Provisional application No. 63/078,221, filed on Sep. 14, 2020.

(51) Int. Cl.
*H04R 5/02* (2006.01)
*G06F 3/16* (2006.01)
*H04R 3/12* (2006.01)

(52) U.S. Cl.
CPC .............. *G06F 3/162* (2013.01); *G06F 3/165* (2013.01); *H04R 3/12* (2013.01); *H04R 2420/07* (2013.01)

(58) Field of Classification Search
CPC ........... G06F 3/162; G06F 3/165; H04R 3/12; H04R 2420/07

USPC .................................................... 381/310, 311
See application file for complete search history.

(56) References Cited

U.S. PATENT DOCUMENTS

| | | | |
|---|---|---|---|
| 8,699,862 B1 * | 4/2014 | Sharifi | G11B 27/28 386/338 |
| 9,026,546 B2 | 5/2015 | Emerson, III | |
| 9,418,669 B2 | 8/2016 | Emerson, III | |
| 9,674,587 B2 | 6/2017 | Triplett et al. | |
| 9,992,316 B2 | 6/2018 | Hardi | |
| 10,003,664 B2 | 6/2018 | Wang et al. | |
| 11,803,348 B1 * | 10/2023 | Puskarich | H04R 3/12 |
| 2007/0022139 A1 | 1/2007 | Stewart | |
| 2014/0336799 A1 | 11/2014 | Emerson, III | |

(Continued)

*Primary Examiner* — Ammar T Hamid
(74) *Attorney, Agent, or Firm* — Treyz Law Group, P.C.; Kendall P. Woodruff

(57) ABSTRACT

An electronic device may include control circuitry that allows a user to listen to audio playing from an external speaker in the environment from the user's personal speaker device such as a pair of headphones, earbuds, or a personal loudspeaker. In response to receiving user input, the control circuitry may gather audio input from the environment with a microphone. The control circuitry may process the detected audio input to identify what audio track is currently playing from the external speaker and to determine which part of the audio track is currently playing. The control circuitry may then start playing the identified audio track from the user's personal speaker device in sync with the audio track playing from the external speaker. The electronic device may search music streaming platforms, public radio station information, and other public music content sources to anticipate and buffer upcoming songs.

20 Claims, 5 Drawing Sheets

(56) References Cited

U.S. PATENT DOCUMENTS

| | | | |
|---|---|---|---|
| 2015/0373474 A1* | 12/2015 | Kraft | H04W 4/02 381/17 |
| 2021/0286589 A1* | 9/2021 | Rhee | G10L 15/22 |

* cited by examiner

ELECTRONIC DEVICES FOR FOCUSED LISTENING

This application is a continuation of U.S. patent application Ser. No. 17/374,348, filed Jul. 13, 2021, which claims the benefit of U.S. provisional patent application No. 63/078,221, filed Sep. 14, 2020, both of which are hereby incorporated by reference herein in their entireties.

FIELD

This relates generally to electronic devices, and, more particularly, to electronic devices that provide audio.

BACKGROUND

Electronic devices such as loudspeaker devices may have speakers for playing audio in a room or other area. It can be challenging for users that wish to tune in to the audio from the loudspeaker. Nearby conversations and other ambient noise may drown out the audio, or the user may wish to listen to the audio at a higher volume.

SUMMARY

An electronic device may include control circuitry that allows a user to listen to audio playing from an external speaker in the environment from the user's personal speaker device such as a pair of headphones, earbuds, or a personal loudspeaker. Upon receiving user input indicating that the user wishes to tune into audio playing in the environment, the control circuitry may gather audio input from the environment with a microphone. The control circuitry may process the detected audio input to identify what songs, podcasts, audio books, or other audio tracks are playing in the environment and to determine which part of the audio track is currently playing. The control circuitry may then start playing the identified audio track from the user's personal speaker device in sync with the audio track playing from the external speaker.

The electronic device may search music streaming platforms, public radio station information, and other public music content sources to anticipate and buffer upcoming songs.

DETAILED DESCRIPTION

Electronic devices such as loudspeaker devices may be used to play audio for one or more users in a room, outdoor environment, or other area. A user may tune into loudspeaker audio from a personal speaker such as headphones, earbuds, a loudspeaker, or other personal speaker device. To synchronize the personal speaker audio with the loudspeaker audio, an electronic device may listen to the loudspeaker audio to determine what audio track is currently playing and to determine what part of the audio track is currently playing. The electronic device may begin playing the same audio track from the user's personal speaker device in sync with the loudspeaker audio. The electronic device may search music streaming platforms, public radio station information, and other public music content sources to anticipate and buffer upcoming songs. In this way, the user can stay tuned in to the audio playing in the surrounding environment, while also being able to control the volume and remove background noise.

Figure 1:
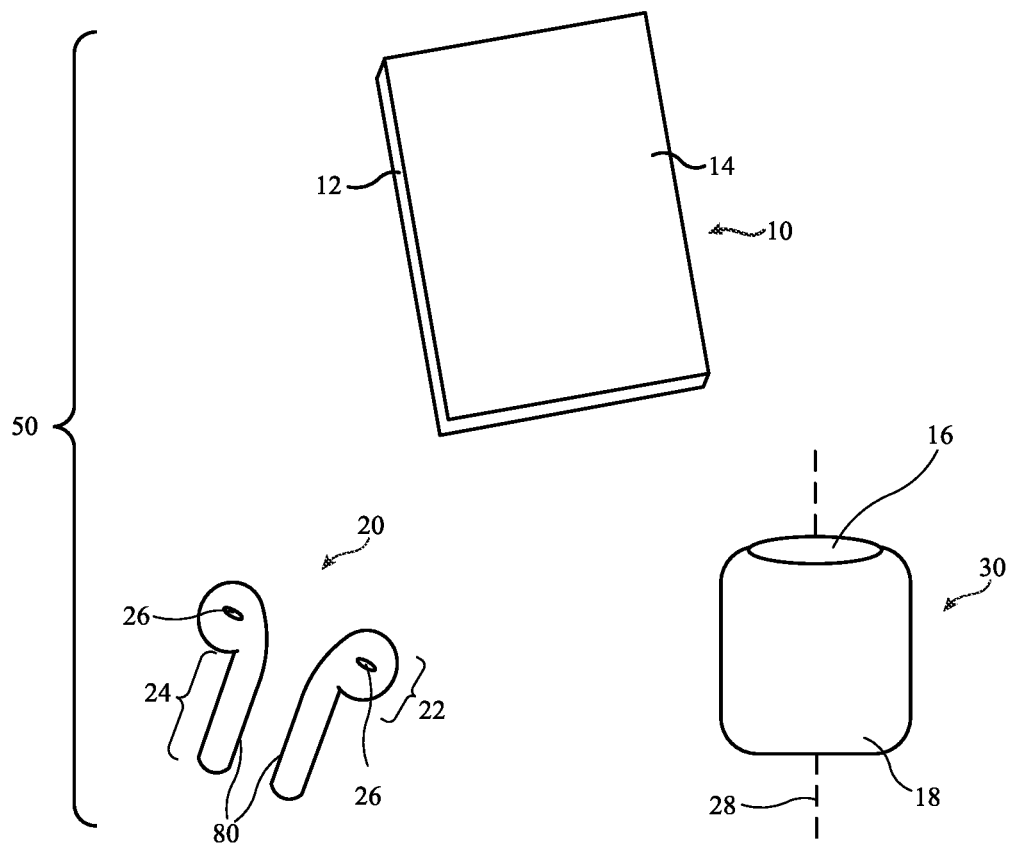
FIG. 1 is a diagram of an illustrative system with an electronic device, a loudspeaker device, and a personal speaker device such as a pair of earphones in accordance with an embodiment.

FIG. 1 is diagram of an illustrative system that may be used to allow a user to listen to loudspeaker audio from a personal speaker. System 50 of FIG. 1 may include electronic device 10, one or more personal speakers 20, and loudspeaker 30.

Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, internet-supplying networking equipment such as a router, a wireless access point, a server, a modem, a base station, equipment that implements the functionality of two or more of these devices, or other electronic equipment. In the illustrative configuration of FIG. 1, device 10 is a portable device such as a cellular telephone, a wristwatch device, media player, tablet computer, or other portable computing device. Other configurations may be used for device 10 if desired. The example of FIG. 1 is merely illustrative.

As shown in FIG. 1, device 10 may include a display such as display 14. Display 14 may be mounted in a housing such as housing 12. For example, device 10 may have opposing front and rear faces and display 14 may be mounted in housing 12 so that display 14 covers the front face of device 10 as shown in FIG. 1. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). If desired, different portions of housing 12 may be formed from different materials. For example, housing sidewalls may be formed from metal and some or all of the rear wall of housing 12 may be formed from a dielectric such as plastic, glass, ceramic, sapphire, etc. Dielectric rear housing wall materials such as these may, if desired, by laminated with metal plates and/or other metal structures to enhance the strength of the rear housing wall (as an example).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of pixels formed from liquid crystal display (LCD) components, an array of electrophoretic pixels, an array of plasma pixels, an array of organic light-emitting diode pixels, an array of electrowetting pixels, or pixels based on other display technologies.

Display 14 may be protected using a display cover layer such as a layer of transparent glass, clear plastic, sapphire, or other transparent dielectric. Openings may be formed in the display cover layer. For example, an opening may be formed in the display cover layer to accommodate a button. Buttons may also be formed from capacitive touch sensors, light-based touch sensors, or other structures that can operate through the display cover layer without forming an opening.

Personal speakers in system 50 such as personal speakers 20 may be speakers that play audio directly to a user's ears (e.g., earbuds, in-ear headphones, over-the-ear headphones, wired or wireless headphones, other suitable earphones, etc.), may be loudspeakers that play audio to the environment for listening by one or more users, or may be any other suitable electronic device having a speaker that plays audio to a user's ears and/or the surrounding environment (e.g., a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which equipment for device 20 is mounted in a kiosk, in an automobile, airplane, or other vehicle, other electronic equipment, or equipment that implements the functionality of two or more of these devices).

Personal speaker device 20 may have a housing such as housing 80. Housing 80 may have one or more housing walls formed from polymer, glass, ceramic, metal, other materials, and/or combinations of these materials. The inner surfaces of the housing wall forming housing 80 may have planar portions and/or curved portions.

The shape of housing 80 may be selected to form an enclosure suited to the type of device 20 for which the housing is being used. As examples, in scenarios in which device 20 is a voice-controlled electronic device, housing 80 may be cylindrical, pyramidal, box-shaped, conical, spherical, or other shapes suitable for enclosing one or more speakers, in configurations in which device 20 is a laptop computer, housing 80 may have upper and lower thin box-shaped portions that are joined with a hinge and that can respectively house a display and a keyboard, in configurations in which device 20 is a computer monitor containing an embedded computer, housing 80 may have a slender box shape with optionally curved rear housing walls that can hold a display and be mounted on a stand, in configurations in which device 20 is a tablet computer, cellular telephone, media player, or other handheld or portable electronic device, housing 80 may have a rectangular outline and a thin depth (e.g., similar to housing 12 of device 10 of FIG. 1), in configurations in which device 20 is a smaller device such as a wristwatch device or a pendant device, housing 80 may have a thin profile and an outline that is rectangular, square, hexagonal, triangular, oval, or circular, in configurations in which device 20 is a headphone or earpiece device, housing 80 may have a shape configured to fit on or in a user's ear, and in configurations in which device 20 is a pair of eyeglasses or other equipment worn on a user's head, housing 80 may have a head-mountable shape.

In the illustrative configuration of FIG. 1, personal speaker device 20 is a pair of earbuds (e.g., a left earbud and a right earbud), and housing 80 has the shape of an earbud.

Openings may be formed in housing 80. For example, housing 80 may include speaker port opening 26 to allow sound that is produced by a speaker in housing 80 to exit housing 80. Housing 80 (and earbuds 20) may have an ear portion such as ear portion 22 configured to be received within the ear of a user and may have a stalk portion such as elongated stalk portion 24 (sometimes referred to as an out-of-ear portion) that is configured to protrude away from ear portion 22 and out of the user's ear. A user may hold stalk portion 24 when placing ear portion 22 into the user's ear. Earbuds 20 may include sensing circuitry (e.g., capacitive sensors, optical sensors, motion sensors such as accelerometers, and/or other sensors) for detecting finger touch gestures (e.g., swipes, taps, double taps, presses, etc.) on stalk portion 24 and/or on ear portion 22.

Loudspeakers in system 50 such as speaker 30 may include loudspeakers that play audio to the environment for listening by one or more users. In the example of FIG. 1, speaker 30 is a voice-controlled speaker or other electronic device having a speaker that plays audio to a surrounding environment (e.g., a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which equipment for device 30 is mounted in a kiosk, in an automobile, airplane, or other vehicle, other electronic equipment, or equipment that implements the functionality of two or more of these devices). Speaker 30 may be a stand-alone speaker or may be a speaker that has been integrated into a wall, ceiling, furniture, infrastructure, television, computer, or other structure.

As shown in FIG. 1, device 30 may include a housing such as housing 18. Housing 18 may have a shape that is suited to the type of device 30 for which the housing is being used (e.g., housing 18 may have the shape of a portable speaker, the shape of a fixed speaker that is mounted to a wall or ceiling, the shape of an electronic device that includes a speaker, etc.).

In the illustrative example of FIG. 1, housing 18 has the shape of a portable speaker. Housing 18 may have a cylindrical shape that wraps around longitudinal axis 28, with rounded upper and lower ends or other suitable shape (e.g., a pyramidal shape, a conical shape, a frustoconical shape, a box shape such as a rectangular box shape, a spherical shape, etc.). Housing 18 may include support structures formed from metal, polymer, ceramic, glass, wood, other materials, and/or combinations of these materials.

If desired, device 30 may include fabric. For example, fabric may form all or part of a housing wall or other layer in an electronic device, may form the outermost layer of device 30, may form one or more inner covering layers, may form internal structures in an electronic device, or may form other fabric-based structures. Device 30 may be soft (e.g., device 30 may have a fabric surface that yields to a light touch), may have a rigid feel (e.g., the surface of device 30 may be formed from a stiff fabric), may have a surface that is textured, that is smooth, that has ribs or other patterned textures, and/or may include portions formed from non-fabric structures of plastic, metal, glass, crystalline materials, ceramics, or other materials.

In an illustrative configuration, some or all of the upper surface of housing 18 such as portion 16 may be formed from rigid polymer, rigid glass, or other non-fabric structure and the sidewall surfaces of housing 18 may be covered with fabric (e.g., to create a cover layer for the sidewalls that is transparent to sound). Portion 16, which may sometimes be referred to as an upper housing wall or top cap, may be a disk. For example, portion 16 may be formed from a disk-shaped polymer or glass member with a slightly curved cross-sectional profile and a circular outline (e.g., portion 16 may form a slightly protruding dome shape or other suitable housing shapes). Portion 16 may be formed from transparent materials. The transparent materials may be translucent (hazy) or may exhibit low haze. The use of translucent material and/or other transparent material for portion 16 allows underlying light-emitting components in the interior of device 30 to emit light that passes through portion 16. For example, portion 16 may be formed from clear material, material with a neutral tint (e.g., dark polymer or glass that allows light to pass), or material with a non-neutral color (e.g., blue, red, etc.).

Portion 16 may overlap a touch sensor. For example, a two-dimensional capacitive touch sensor may be formed from an array of capacitive touch sensor electrodes that are overlapped by portion 16. Capacitive touch sensor circuitry may be coupled to the touch sensor electrodes and may gather user touch input through portion 16. The capacitive touch sensors may be formed directly on the inner surface of portion 16, which therefore serves as a substrate for the touch sensors, or may be formed on separate supporting structures (e.g., a separate polymer film or other separate substrate). Capacitive touch sensor electrodes may be formed from conductive material such as metal, transparent conductive material such as indium tin oxide, or other conductive materials. If desired, one-dimensional, two-dimensional, and/or three-dimensional sensors such as proximity sensors, optical touch sensors, force sensors, image sensors, time-of-flight sensors, vibration sensors such as accelerometers, and/or other sensors may be formed under portion 16 or other portions of housing 18 (e.g., instead of a two-dimensional capacitive touch sensor or in addition to a two-dimensional capacitive touch sensor). If desired, sensors may operate through fabric sidewalls or other housing structures.

Figure 2:
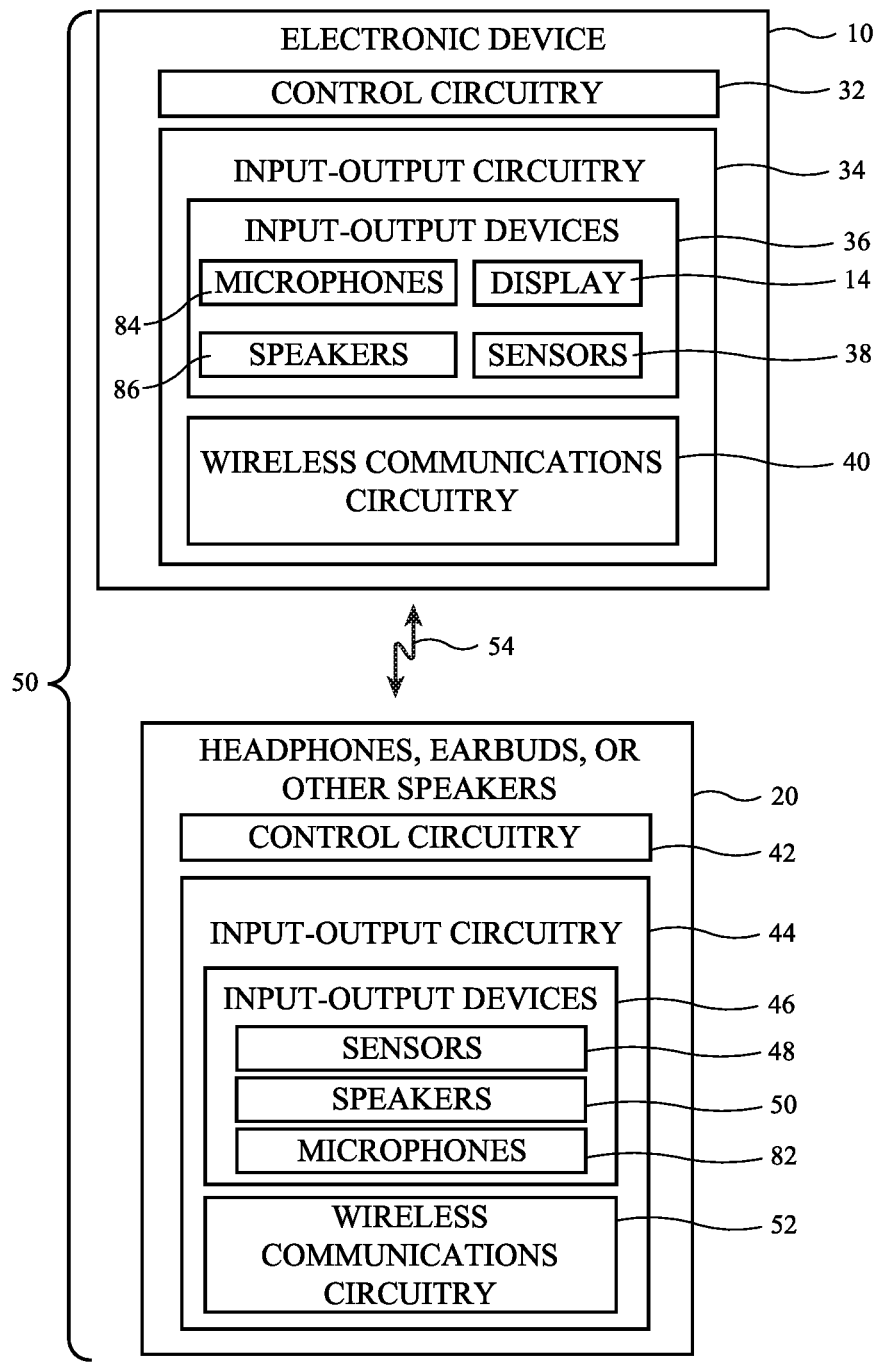
FIG. 2 is a schematic diagram of an illustrative system with an electronic device that plays audio through a speaker in accordance with an embodiment.

FIG. 2 is a schematic diagram of system 50 showing illustrative circuitry that may be included in electronic device 10 and personal speaker 20.

As shown in FIG. 2, electronic device 10 may have control circuitry 32. Control circuitry 32 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 32 may be used to control the operation of device 10. The processing circuitry may be based on one or more microprocessors, microcontrollers, digital signal processors, baseband processors, power management units, audio chips, application specific integrated circuits, etc.

Input-output circuitry 34 in device 10 may include input-output devices 36 for allowing data to be supplied to device 10 and allowing data to be provided from device 10 to external devices. Input-output devices 36 may include buttons, joysticks, scrolling wheels, touch pads, key pads, keyboards, tone generators, vibrators, cameras, light-emitting diodes (e.g., arrays of light-emitting diodes), lasers, and/or other light-emitting components, data ports, etc. A user can control the operation of device 10 by supplying commands through input-output devices 36 and may receive status information and other output from device 10 using the output resources of input-output devices 36.

Input-output devices 36 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Input-output devices 36 may include one or more audio devices such as one or more speakers 86 (e.g., tweeters, midrange speakers, woofers, subwoofers, etc.) and one or more microphones 84 (e.g., microphones for gathering voice command input, microphones that measure ambient noise as part of a noise cancellation system, microphones in echo-location sensors, etc.).

Input-output devices 36 may also include sensors 38. Sensors 38 may include a capacitive sensor, a light-based proximity sensor, a magnetic sensor, an accelerometer, a force sensor, a touch sensor, a temperature sensor, a pressure sensor, a compass, a microphone, and other sensors. Sensors 38 may also include one or more color ambient light sensors. A color ambient light sensor may be used to measure the color (color spectrum, color temperature, color coordinates, etc.) of ambient light and may be used to measure ambient light intensity.

Input-output circuitry 34 may include wireless communications circuitry 40 for communicating wirelessly with external equipment such as personal speaker device 20. Wireless communications circuitry 40 may include radio-frequency (RF) transceiver circuitry formed from one or more integrated circuits, power amplifier circuitry, low-noise input amplifiers, passive radio-frequency components, one or more antennas, transmission lines, and other circuitry for handling radio-frequency wireless signals. Wireless signals can also be sent using light (e.g., using infrared communications).

Wireless communications circuitry 40 may allow electronic device 10 to communicate wirelessly with external equipment such as personal speaker device 20 using wireless link 54. Wireless signals for link 54 may be light-based signals, may be acoustic signals, and/or may be radio-frequency signals (e.g., wireless local area network signals, Bluetooth® signals, radio-frequency signals in cellular telephone band, signals at 60 GHz, near field communications signals, etc.).

Device 20 may include control circuitry 42. Control circuitry 42 may include microprocessors, microcontrollers, application-specific integrated-circuits, digital signal processors, baseband processors, and/or other controllers and may include storage such as random-access memory, read-only memory, solid state drives, and/or other storage and processing circuitry.

Control circuitry 42 may gather information from sensors and other circuitry in input-output circuitry 44 and may use input-output circuitry 44 to supply output. Input-output devices 46 in circuitry 44 may, for example, include one or more audio devices such as one or more speakers 90 (e.g., tweeters, midrange speakers, woofers, subwoofers, etc.) and one or more microphones 82 (e.g., microphones for gathering voice command input, microphones that measure ambient noise as part of a noise cancellation system, microphones in echolocation sensors, etc.).

Sensors 48 in input-output devices 46 may include optical sensors such as optical proximity sensors (e.g., sensors that include an infrared light source such as an infrared light emitting diode or infrared laser and a corresponding infrared light detector to measure how much of the emitted infrared light is reflected from external objects), accelerometers and/or other sensors for detecting taps (e.g., single taps, double taps, triple taps, etc.) against device 20 and for detecting motion and orientation for earbud 20, magnetic sensors, force sensors, microphones, light detectors, etc.

Input-output circuitry 44 may include wired and/or wireless communications circuitry. For example, device 20 may include wireless communications circuitry 52. Wireless communications circuitry 52 may include radio-frequency transceiver circuitry such as cellular telephone transceiver circuitry, wireless local area network transceiver circuitry (e.g., WiFi® circuitry), personal area network circuitry (e.g., Bluetooth® circuitry), other circuitry for supporting local and/or remote wireless communications links such as link 54, and/or other wireless communications circuitry.

Figure 3:
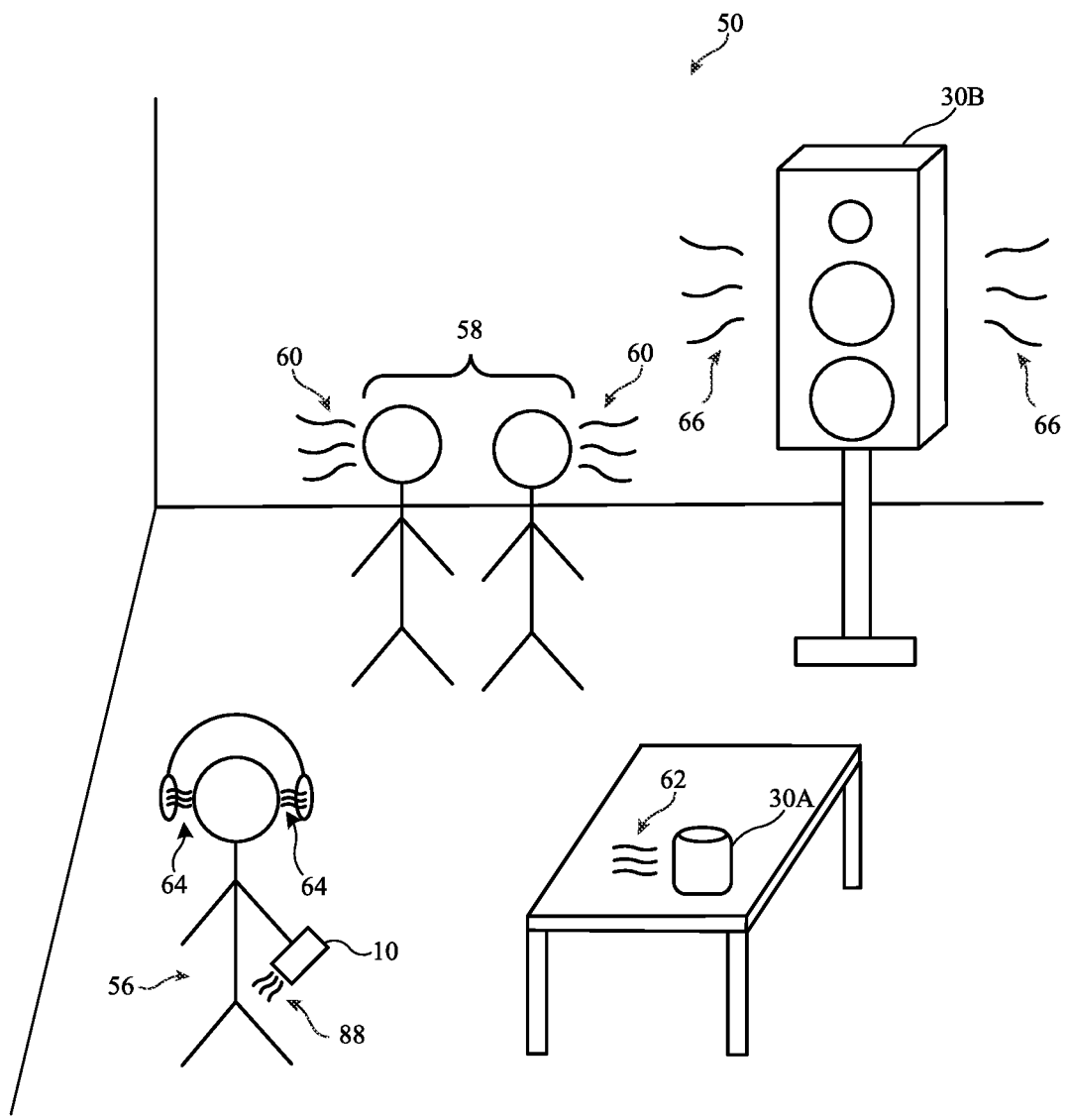
FIG. 3 is a diagram of an illustrative environment in which an electronic device may allow a user to listen to audio playing from a loudspeaker device from a personal speaker device in accordance with an embodiment.

FIG. 3 is a diagram of an illustrative environment in which system 50 may operate. Although FIG. 3 illustrates device 20 as a pair of headphones, device 20 may be any other suitable device with speakers (e.g., earbuds, in-ear headphones, a loudspeaker such as a portable speaker similar to device 30 of FIG. 1, and/or any other suitable speaker device). Arrangements in which user 56 has multiple different types of speaker devices 20 may also be used, if desired.

User 56 may be in an environment in which one or more sources of audio are playing to the environment. For example, user 56 may be in a café setting, an office setting, a home setting, an outdoor setting, coffee shop setting, or any other suitable setting. In this setting, one or more loudspeaker devices 30 such as portable speaker 30A and tower speaker 30B may be providing loudspeaker audio to the environment. For example, portable speaker 62 may be playing loudspeaker audio 62 to the surrounding environment, and tower speaker 30B may be playing loudspeaker audio 66 to the surrounding environment. Audio 62 and audio 66 may be the same audio (e.g., speakers 30A and 30B may be playing the same radio station, podcast, playlist, song, audio book, or other audio), or audio 62 and audio 66 may be different (e.g., speaker 30A may be playing a radio station, podcast, playlist, song, audio book, or other audio, and speaker 30B may be playing a different radio station, podcast, playlist, song, audio book, or other audio).

User 56 may wish to "tune in" to the loudspeaker audio playing from loudspeaker 30A and/or loudspeaker 30B from the user's personal speaker device such as device 20 and/or device 10. For example, background noise such as noise 60 from a nearby conversation between people 58 may be drowning out audio 62 and/or audio 66 for user 56; user 56 may wish to only hear audio 62 and not audio 66 (or vice versa); user 56 may wish to focus on what he or she is doing and may want to listen to audio on headphones 20 while still listening to the music or other audio being played in the surrounding environment; user 56 may wish to listen to audio 62 and/or audio 66 at a higher volume than that of speaker 30A and/or speaker 30B; and/or user 56 may otherwise wish to listen to loudspeaker audio playing from another speaker such as speaker 30A and/or speaker 30B on the user's personal speaker device such as device 20 and/or device 10.

When user 56 wishes to listen to loudspeaker audio 62 and/or loudspeaker audio 66 from speaker 86 in device 10, from speaker 90 in device 20, and/or from any other suitable speaker, user 56 may provide appropriate input to device 10 and/or device 20 (e.g., touch input, voice input, button input, tap input, pointing input, or any other suitable input). For example, user 56 may provide touch input to display 14 on device 10 or may point device 10 at the loudspeaker 30A or 30B that is playing the audio that user 56 wishes to listen to from device 20 and/or device 10. In response to receiving user input indicating that user 56 wishes to tune in to loudspeaker audio, control circuitry 32 in device 10 may gather audio input using one or more microphones 84. This may include, for example, using microphones 84 to listen to surrounding audio in the environment such as loudspeaker audio 62 from speaker 30A, loudspeaker audio 66 from speaker 30B, and ambient noise such as noise 60 coming from the surrounding environment. Microphone 84 may convert the incoming sound to an electrical signal, which in turn may be processed by control circuitry 32.

Control circuitry 32 may process and analyze the detected audio signal from the environment to determine what song, podcast, audio book, or other audio is playing in the environment. This may include, for example, using an audio fingerprinting process (e.g., converting analog sound waves into a digitally sampled signal, converting the digitally sampled signal to the frequency domain, audio fingerprinting by identifying key frequencies in the detected audio, and searching a database of songs, podcasts, audio books, and/or other audio databases for a corresponding set of key frequencies). Control circuitry 32 may, for example, identify that speaker 30A is playing a particular podcast (e.g., podcast Y) and speaker 30B is playing a particular song (e.g., song X).

Upon determining what audio is playing from speaker 30A and/or speaker 30B, circuitry 32 may then automatically start playing the same audio from speakers 90 in headphones (e.g., audio 64) and/or from speakers 86 in device 10 (e.g., audio 88), or device 10 may present user 56 with a description of the audio (e.g., a name of the song, podcast, audio book, or other audio playing in the environment) so that user 56 can decide whether he or she wants to listen to the audio and, if multiple sources of audio are present, can select which audio source he or she wants to tune in to. Upon selecting which audio user 56 wishes to tune in to (e.g., audio 62, audio 66, or other audio in the environment), device 10 may begin playing the audio with speakers 90 in headphones 20 and/or with speakers 86 in device 10.

If desired, control circuitry 32 may synchronize the timing of personal audio 64 and/or personal audio 88 with the timing of loudspeaker audio 62 and/or loudspeaker audio 66 so that the personal audio is playing the same thing at the same time as the loudspeaker audio. Control circuitry 32 may determine what part of an audio track is currently playing based on the audio input detected by microphone 84 and may start playing the audio track from speaker 90 and/or speaker 86 from the same part that is currently playing in the environment.

If desired, the user's personal speaker devices may perform noise cancelling operations so that background noise such as noise 60 is removed from personal audio 64 and/or personal audio 88. For example, control circuitry 32 in device 10 may use microphones 84 to detect background noise 60 and remove the background noise from personal audio 88. Control circuitry 42 in headphones 20 may use microphones 82 to detect background noise 60 and remove the background noise from personal audio 64. In this way, user 56 may focus on what he or she is doing without being distracted by background noise 60, while still staying tuned in to the audio playing in the surrounding environment from the user's personal speaker devices.

If desired, control circuitry 32 may determine whether loudspeaker audio 62 and/or loudspeaker audio 66 is playing songs from a radio station (e.g., a terrestrial radio station, a radio station on a music streaming service, etc.), a playlist (e.g., a public playlist, a playlist from a music streaming service, or other playlist), a soundtrack, album, or other collection of songs. For example, control circuitry 32 may search databases on the internet, on a music application on device 10, in the cloud, etc. to see whether the song or songs identified in the detected audio correspond to a particular track list so that control circuitry 32 can anticipate upcoming songs and buffer (e.g., download) audio that will be played next on speaker 30A and speaker 30B so that personal audio 64 and/or personal audio 88 stays in sync with loudspeaker audio 62 and/or loudspeaker audio 66.

FIGS. 4, 5, 6, and 7 are illustrative screens from device 10 showing how a user may tune in to loudspeaker audio playing in the environment from a personal speaker such as headphones, earbuds, or a personal loudspeaker device.

Figure 4:
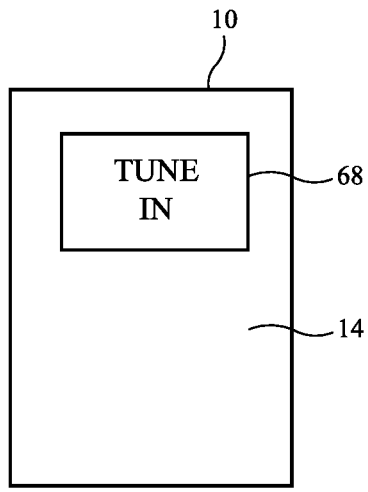
FIG. 4 is a front view of an illustrative electronic device displaying an option to listen to audio from a loudspeaker in accordance with an embodiment.

As shown in FIG. 4, display 14 may display an option such as option 68 to "tune in" to audio playing in the surrounding environment. Upon selecting option 68 (e.g., by providing touch input to option 68 on display 14), control circuitry 32 may begin listening to ambient audio (e.g., loudspeaker audio 62, loudspeaker audio 66, and background noise 60 of FIG. 30) using microphone 84. If desired, other types of user input (e.g., user 56 pointing device 10 towards the loudspeaker that is playing the audio that user 56 wishes to listen to from device 10) in addition to or instead of touch input may cause control circuitry 32 to begin listening to ambient audio.

Figure 5:
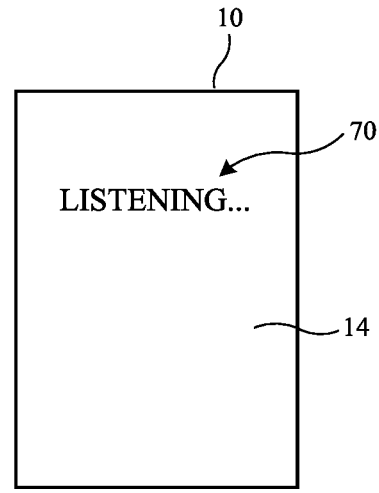
FIG. 5 is a front view of an illustrative electronic device displaying an image while the electronic device detects audio playing from a loudspeaker in accordance with an embodiment.

FIG. 5 shows how display 14 may indicate that device 10 is listening to the ambient environment while control circuitry 32 collects audio input with microphone 84. Control circuitry 32 may process the detected audio using an audio fingerprinting process to identify the audio track (e.g., song, podcast, audio book, or other audio content) that is currently playing in the surrounding environment and to determine what part of the audio track is currently playing.

Figure 6:
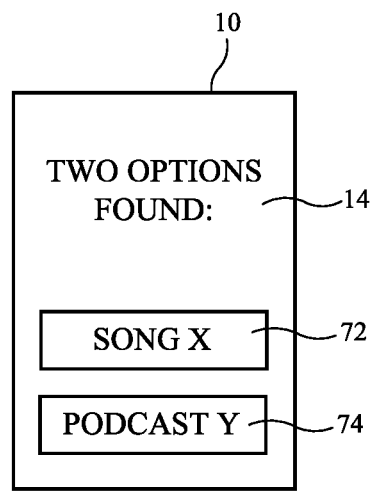
FIG. 6 is a front view of an illustrative electronic device displaying options for detected loudspeaker audio that the user can listen to from a personal speaker in accordance with an embodiment.

Upon identifying what audio is playing in the environment, control circuitry 32 may present the identified audio on display 14, as shown in FIG. 6. If more than one audio item has been identified in the detected audio, display 14 may display all the audio items on display 14 so that the user can select which audio item the user wishes to tune in to. For example, display 14 may display option 72 for song X playing (e.g., from speaker 30A) and option 74 for podcast Y playing (e.g., from speaker 30B). The user may then select which audio he or she wishes to listen to by selecting one of options 72 and 74.

If desired, control circuitry 32 may automatically start playing the identified audio and the option screen of FIG. 6 may be skipped.

Figure 7:
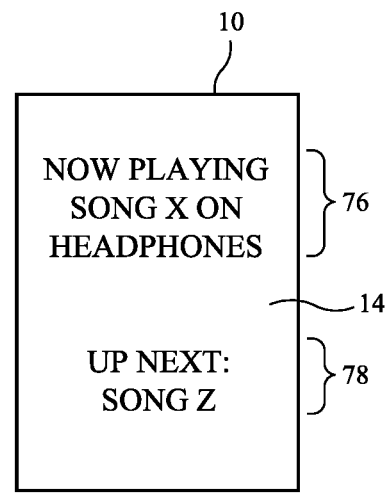
FIG. 7 is a front view of an illustrative electronic device displaying current and up next song information associated with the loudspeaker audio that the user is listening to from a personal speaker in accordance with an embodiment.

Upon receiving the user's selection on the screen of FIG. 6, control circuitry 32 may start playing the loudspeaker audio from the user's personal speaker in sync with the loudspeaker (e.g., from the same part of the audio track that is currently being played from the loudspeaker). If desired, display 14 may display the name of the audio track that is currently playing, as shown in FIG. 7. Current audio information 76 on display 14 may include the name of the song or other audio track playing and may, if desired, show what personal speaker device is being used to play the audio. Upcoming audio information 78 may include information about what song is playing next, what chapter in an audio book is coming next, what podcast episode is next, etc. Information 78 may be displayed in response to control circuitry 32 determining that the current loudspeaker audio playing in the environment is a publicly identifiable radio station, playlist, audio book, album, or other known list of audio tracks.

Figure 8:
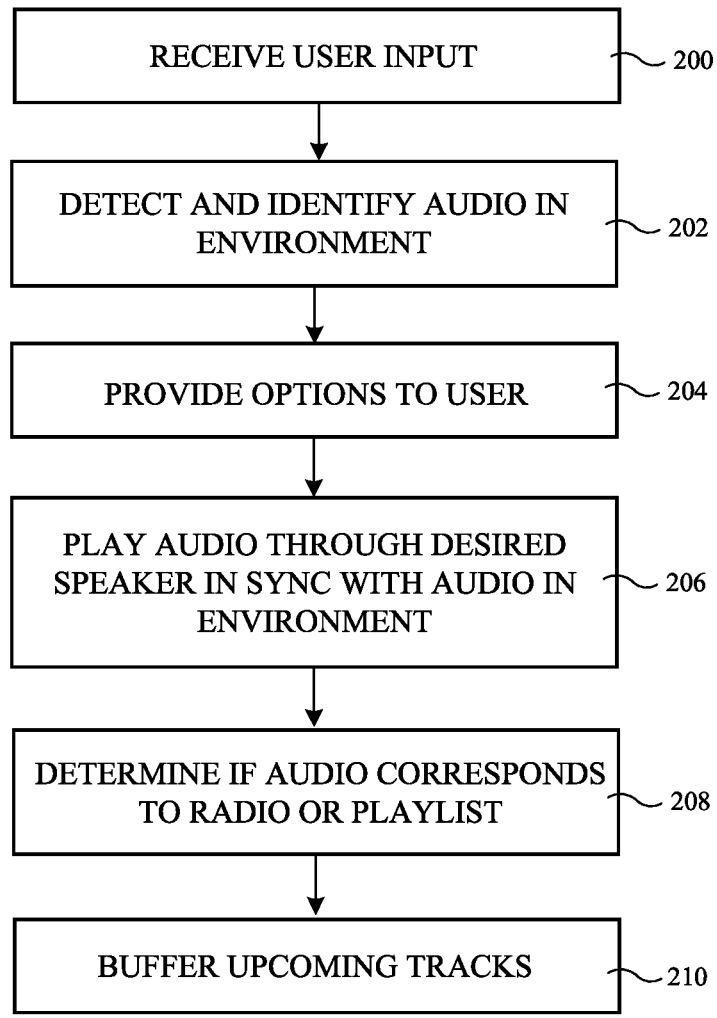
FIG. 8 is a flow chart of illustrative steps involved in using an electronic device to listen to loudspeaker audio from a personal speaker in accordance with an embodiment.

FIG. 8 is a flow chart of illustrative steps involved in using an electronic device to tune in to loudspeaker audio playing in the environment from a personal speaker such as headphones, earbuds, or a user's personal loudspeaker.

During the operations of block 200, control circuitry 32 may receive user input indicating that the user wishes to listen to audio that is playing in the environment from the user's personal speaker (e.g., speaker 86 in device 10, speaker 90 in device 20, and/or any other speaker). The user input may be touch input to display 14 (e.g., touch input to option 68 of FIG. 4) or other touch input, voice input, pointing input (e.g., the user may point device 10 towards the speaker that is producing the audio the user wishes to listen to from the user's personal speaker), and/or other suitable user input.

During the operations of block 202, control circuitry 32 may use one or more microphones 84 in device 10 (or microphone 82 in device 20) to detect incoming sound from the environment. This may include, for example, detecting sound from multiple sources such as audio 62 from speaker 30A, audio 66 from speaker 30B, and background noise 60 from nearby conversations and other ambient noise. Control circuitry 32 may use an audio fingerprinting process to identify what songs, podcasts, audio books, and/or other audio may be present in the detected sound. This may include, for example, converting the detected analog sound waves into a digitally sampled signal, converting the digitally sampled signal to the frequency domain, audio fingerprinting by identifying key frequencies in the detected audio, and searching an online database for a corresponding set of key frequencies.

During the operations of optional block 204, control circuitry 32 may present the identified audio options to the user. For example, control circuitry 32 may display the name(s) of the songs, podcasts, audio books, and/or other audio tracks that have been identified in the detected audio. Upon receiving user input selecting one of the available audio options (e.g., options 72 and 74 on display 14 of FIG. 6), processing may proceed to block 206. If desired, block 204 may be omitted, and processing may proceed directly from block 202 to block 206.

During the operations of block 206, control circuitry 32 may begin playing the desired loudspeaker audio (e.g., corresponding to the option selected by the user, corresponding to the loudest song playing in the environment, etc.) from the user's selected personal speaker. For example, if device 10 is currently connected to headphones or other speaker device 20 (e.g., via a wired or wireless connection), control circuitry 32 may play the desired audio from speaker 90 in device 20. If device 10 is not currently connected to headphones or any other speaker device, control circuitry 32 may play the desired audio from speaker 86 in device 10. Control circuitry 32 may synchronize the timing of the audio playing from device 20 and/or device 10 with the audio playing in the environment. For example, if song X is currently playing (e.g., one minute into the song) from speaker 30A and a user selects song X (option 72 of FIG. 6) on device 10, then control circuitry 32 may start playing song X from the same point in the song that is currently playing from speaker 30A (e.g., one minute into the song). This allows the user to feel in sync with the surrounding environment, while also allowing the user to listen to the same audio at a different volume and without the distraction of nearby background noise (e.g., noise 60 of FIG. 3), which may be canceled using noise cancellation circuitry in device 10 and/or device 20.

During the operations of block 208, control circuitry 32 may determine whether the audio detected in the environment corresponds to a radio station (e.g., terrestrial radio station, radio station on a music streaming service, etc.), a playlist (e.g., a playlist from a music streaming service or other playlist), a soundtrack, an album, an audio book, or other known list of tracks. For example, control circuitry 32 may search databases on the internet, a music application on device 10, the cloud, etc., to see whether the audio track or tracks identified in the detected audio correspond to a particular track list so that control circuitry 32 can anticipate upcoming songs.

During the operations of block 210, control circuitry 32 may download one or more of the upcoming audio tracks that were identified during the operations of block 208. In this way, device 10 may buffer audio that will be played next on speaker 30A and/or speaker 30B so that personal audio 60 and/or personal audio 88 can stay in sync with loudspeaker audio 62 and/or loudspeaker audio 66. If no publicly available track list is identified during the operations of block 208, control circuitry 32 may repeat the steps of block 202, 204, and 206 when a new track starts playing in the environment, if desired.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to have control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. A system, comprising:
a first electronic device comprising a first speaker;
a second electronic device comprising a second speaker; and
a microphone configured to detect first audio playing from the first speaker, wherein the second speaker is configured to play second audio that is synchronized with the first audio based on information from the microphone.

2. The system defined in claim 1 wherein the first electronic device comprises a voice-controlled electronic device.

3. The system defined in claim 1 wherein the microphone is located in the first electronic device.

4. The system defined in claim 1 further comprising a cellular telephone, wherein the microphone is located in the cellular telephone.

5. The system defined in claim 4 wherein the cellular telephone comprises a touch screen display and wherein the microphone is configured to detect the first audio playing from the first speaker in response to touch input to the touch screen display.

6. The system defined in claim 5 wherein the touch screen display is configured to display information about the first audio that is detected with the microphone while the second audio plays from the second speaker.

7. The system defined in claim 1 wherein the second electronic device comprises a pair of headphones.

8. The system defined in claim 7 wherein the second electronic device comprises noise cancellation circuitry that removes background noise from the second audio.

9. The system defined in claim 1 further comprising control circuitry configured to determine whether the first audio corresponds to a song currently playing on a public radio station and to buffer upcoming songs to be played on the public radio station.

10. The system defined in claim 1 further comprising control circuitry configured to determine whether the first audio corresponds to a song in a public playlist and is configured to buffer upcoming songs to be played on the public playlist.

11. A system, comprising:
an electronic device having a first speaker configured to play first audio; and
a cellular telephone having a touch screen display, a microphone, and a second speaker, wherein:
the microphone is configured to detect the first audio playing from the first speaker in response to user input to the touch screen display; and
the second speaker is configured to play second audio that is synchronized with the first audio based on information from the microphone.

12. The system defined in claim 11 further comprising control circuitry configured to determine whether the first audio corresponds to a song currently playing on a public radio station and to buffer upcoming songs to be played on the public radio station.

13. The system defined in claim 11 further comprising control circuitry configured to determine whether the first audio corresponds to a song in a public playlist and is configured to buffer upcoming songs to be played on the public playlist.

14. The system defined in claim 11 wherein the touch screen display is configured to display information about the first audio that is detected with the microphone.

15. The system defined in claim 11 wherein the electronic device comprises a voice-controlled electronic device.

16. A system, comprising:
a first electronic device comprising a first speaker;
a second electronic device comprising a second speaker; and
a third electronic device comprising a touch screen display and a microphone, wherein:
the microphone is configured to detect first audio playing from the first speaker in response to touch input to the touch screen display; and
the second speaker is configured to play second audio that is synchronized with the first audio based on information from the microphone.

17. The system defined in claim 16 wherein the first electronic device comprises a voice-controlled electronic device.

18. The system defined in claim 16 wherein the touch screen display is configured to display information about the first audio that is detected with the microphone.

19. The system defined in claim 16 wherein the second electronic device comprises a pair of headphones.

20. The system defined in claim 19 wherein the second electronic device comprises noise cancellation circuitry that removes background noise from the second audio.

* * * * *